(12) United States Patent
Goker

(10) Patent No.: US 6,317,283 B1
(45) Date of Patent: Nov. 13, 2001

(54) METHODS AND APPARATUS FOR CALIBRATION OF A ROTATING SCANNER TO A TRACK RECORDED ON A TAPE

(75) Inventor: Turguy Goker, Solana Beach, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/495,475

(22) Filed: Feb. 1, 2000

Related U.S. Application Data

(63) Continuation of application No. 08/941,972, filed on Oct. 1, 1997, now Pat. No. 6,072,653.

(51) Int. Cl.$^7$ .................................................. G11B 15/46
(52) U.S. Cl. ..................................... 360/73.08; 360/73.11
(58) Field of Search .................................. 360/64, 75, 70, 360/51, 53, 73.08, 73.11, 77.12, 77.13, 77.14, 73.01, 73.04, 73.07

(56) References Cited

U.S. PATENT DOCUMENTS

| | | | |
|---|---|---|---|
| 5,546,247 | 8/1996 | Fujioka et al. | 360/77.13 |
| 5,796,537 | 8/1998 | Goker et al. | 360/64 |
| 5,959,799 | 9/1999 | Deoka | 360/73.04 |

*Primary Examiner*—Andrew L. Sniezek
(74) *Attorney, Agent, or Firm*—McDermott, Will & Emery

(57) ABSTRACT

An apparatus for calibrating a tape drive that includes a rotating scanner for reading the tracks on the tape and a tape drive servo for transporting the tape in response to a control signal. The apparatus includes a signal generator and a controller. The signal generator generates an indexing signal based on the rotational position of the scanner. The controller is coupled to the scanner, the tape drive servo and the signal generator, and provides a control signal to the tape drive servo causing the tape drive servo to transport the tape at either above or below a nominal speed. The controller detects an envelope for each of a plurality of scanned signals and the sub code data within each of the scanned signals, determines an envelope measurement for each envelope based on at least one sample magnitude of the envelope and measures a delay time for each of the scanned signals. The delay time is based on the indexing signal and the detection of the sub code data. The controller calculates an optimal delay time by determining when the envelope measurement is substantially at a maximum value based on an approximating function of the envelope measurements and delay times associated with a plurality of scanned signals. The controller changes the control signal so as to direct the tape drive servo to transport the tape at a speed that causes subsequent delay times associated with subsequent scans to be approximately equal to the optimal delay time.

3 Claims, 6 Drawing Sheets

METHODS AND APPARATUS FOR CALIBRATION OF A ROTATING SCANNER TO A TRACK RECORDED ON A TAPE

RELATED APPLICATIONS

This patent application is a continuation of U.S. application Ser. No. 08/943,041, filed on Oct. 1, 1997, now U.S. Pat. No. 6,101,061, titled METHODS AND APPARATUS FOR CALIBRATION OF A ROTATING SCANNER TO A PLURALITY OF DATA TRACK GROUPS RECORDED ON A TAPE.

TECHNICAL FIELD

The present invention relates to tape drives, and more particularly, to methods and apparatus for calibrating a rotating scanner within the tape drive to a plurality of digital data tracks recorded on a tape.

BACKGROUND ART

Tape drives, such as, for example, digital data storage (DDS) tape drives are commonly used to back up and record information in the form of digital data from a computer system. A DDS tape drive, for example, is a helical scanning tape drive that writes and reads information in the form of digital data to and from a magnetic tape. DDS tape drives provide a low cost storage mechanism that is light weight, compact and typically very reliable. DDS tape drives have continued to evolve over time, such that each new generation of DDS drives and DDS formatted tapes provides additional storage capacity over the earlier generations.

One advantage of DDS tape drives over linear tape drives is the use of a helical scanning method that allows very high recording densities. Basically, a helical scanning method, such as, for example, in a DDS tape drive, uses a rapidly rotating scanner that has two read heads and two write heads (i.e., for a total of four transducers). The rotating scanner is tilted at an angle in relation to the horizontal movement of the tape, which is being transported at a given speed, and the tape is wrapped about at least a portion of the scanner. Thus, the horizontal tape movement against the tilted and rotating scanner causes diagonally positioned tracks to be written to the tape (and subsequently read from the tape). The speed and tension of the tape are typically kept constant by a tape drive servoing system that includes controlling circuitry and mechanical mechanisms, such as, for example, a capstan and series of rollers and guides.

The format of the recorded data tracks (e.g., containing raw, compressed, timing, control and/or error correction data) on a DDS formatted tape, for example, is mandated by a specific DDS standard.

During a read operation of a DDS formatted tape, it is essential to match the tracks as laid down during the previous write operation with the read heads located on the scanner so as to read the data within each track. This is typically done by calibrating the speed at which the tape is transported to properly align the read heads of the scanner to the previously recorded tracks.

Earlier DDS standards, such as, for example, the DDS1 and DDS2 formats, use an automatic track finding (ATF) technique to calibrate the scanner to the tracks. In an ATF formatted tape there are a plurality of sub code areas recorded within each track that can be detected and used to determine if a read head is properly aligned over the track. Thus, for example, in a DDS2 formatted tape, the resulting signals from the read head scanning different sub code areas are used to determine if the tracking is proper (i.e., that the read head is centered over the track). Thus, based on the sub codes recorded in the tracks of the DDS2 tape, the speed of the tape within the DDS tape drive is adjusted such that the read head is properly aligned with the recorded tracks. As such, several sub codes are typically required in the earlier DDS formatted tapes. For example, a DDS2 formatted tape includes eight sub codes at the top of each track and eight sub codes at the bottom of each track.

One drawback to an ATF formatted tape, such as DDS2 formatted tape, is the number and size of the sub codes and the amount of space on the recording tape that is required to record these sub codes.

Moreover, because there is a continuing effort to increase the amount of data storage capacity in the DDS tape drive family, the next generation standard format, namely a DDS3 format, does not include ATF. As a result, timing and tracking has to be accomplished through different techniques.

The DDS3 format does not specify how the timing and tracking of a read operation is to be accomplished within the tape drive. Instead this decision has been left to the DDS tape drive design community. Thus, there is a need for efficient methods and apparatus for calibrating and controlling the timing and tracking in a DDS tape drive capable of supporting a DDS formatted tape that does not include ATF information.

SUMMARY OF THE INVENTION

The present invention provides methods and apparatus that provide efficient, reliable and effective calibration of a tape drive's scanner to the tracks recorded on the tape. These methods and apparatus can be included, for example, in a tape drive as part of a servoing system that synchronizes a rotating scanner with the tape during and/or prior to a read operation. The various embodiments of the present invention can be, for example, embodied within a dedicated circuit and/or general purpose circuit, and/or in computer implement instructions stored in a computer readable medium and for use with a computer processor or like circuit.

Thus, in accordance with an embodiment of the present invention there is provided a calibration method for controlling a speed at which a tape is transported past a rotating scanner. The calibration method includes setting the speed of the tape to a first speed and scanning the tape with the scanner to produce a set of scanned signals wherein each of the scanned signals includes sub code data, and measuring an envelope measurement and a delay time for each of the scanned signals. The envelope measurement is based on a sample of an envelope of the scanned signal and the delay time is based on an indexing signal corresponding to a rotational position of the scanner and detection of the sub code data.

The calibration method further includes determining an optimal delay time based on an interpolation of the envelope measurements and delay times associated with the set of scanned signals. The optimal delay time occurs when the envelope measurement is substantially at a maximum value based on an interpolation and/or approximating function relating to the envelope measurements. The calibration further includes setting the speed of the tape to a second speed based on the calculated optimal delay time. Thus, when the tape is transported at this second speed, the scanner and tracks will be significantly aligned during subsequent scans.

In accordance with certain embodiments, the first speed is either greater than or less than an expected speed associated with the tape. For example, in one embodiment the first speed is approximately 10% greater or less than the expected speed.

The earlier stated needs are also satisfied by a method for calibrating a tape drive to the tracks recorded on a tape. The tape drive has a rotating scanner, and the tape has a timing mechanism that includes discretely located sub code data that is recorded within a plurality of tracks recorded on a tape. The method includes transporting the tape past the rotating scanner at a first speed, while the tape is wrapped about a portion of the rotating scanner. The method includes generating a plurality of scanned signals with at least one transducer located on the rotating scanner, wherein each of the scanned signals is proportional to a portion of the recorded data in at least one of the tracks on the tape as sensed by the transducer. The method continues by detecting a corresponding envelope for each of the scanned signals, detecting sub code data within each of the scanned signals, and measuring a delay time, for each of the scanned signals. The delay time is measured between a corresponding indexing signal and the detection of the sub code data, wherein the indexing signal is associated with a rotational position of the rotating scanner.

The method flier includes discretely sampling each of the envelopes to produce a corresponding envelope measurement for each envelope, determining a substantially maximum value for an approximating function corresponding to a combined plot of the envelope measurements versus the measured delay times associated with at least a subset of the scanned signals. Next, a substantially optimal delay time is determined based on the maximum value and the approximating function, and the speed of the-tape is changed to a second speed. The second speed is such that subsequent delay times associated with subsequent scanned signals are approximately equal to the optimal delay time.

In accordance with other embodiments of the present invention an apparatus is provided for use in calibrating a tape drive based on discretely located sub code data within a plurality of tracks recorded on a tape. Preferably, the tape drive includes a rotating scanner for reading the tracks on the tape and a tape drive servo for transporting the tape in response to a control signal. The apparatus includes a signal generator and a controller. The signal generator is configured to generate an indexing signal based on at least one predetermined rotational position of the scanner.

The controller is coupled to the scanner, the tape drive servo and the signal generator. The controller is configured to provide the control signal to the tape drive servo so as to cause the tape drive servo to transport the tape at a first speed. The controller detects an envelope for each of a plurality of scanned signals as generated by the scanner, and the sub code data within each of the scanned signals. The controller determines an envelope measurement for each envelope based on at least one sample magnitude of the envelope and also measures a delay time, for each of the scanned signals. The delay time is based on the indexing signal and the detection of the sub code data The controller is also configured to calculate an optimal delay time. The optimal delay time is calculated by determining when the envelope measurement is substantially at a maximum value based on the envelope measurements and delay times associated with the plurality of scanned signals. Once the optimal delay time is calculated, then the controller changes the control signal provided to the tape drive servo so as to direct the tape drive servo to transport the tape at a second speed The second speed is such that subsequent delay times associated with subsequent scans of the tape are approximately equal to the optimal delay time.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements in which.

DETAILED DESCRIPTION OF AN EXEMPLARY EMBODIMENT

The methods and apparatus of the present invention are applicable to the DDS family of tapes, including DDS1, DDS2 and DDS3 formatted tapes. The present invention is also applicable to other tape formats that, like the DDS family, include indicators within at least a portion of tracks that can be used in calibrating and/or maintaining alignment of the tape drive to the tracks. The methods and apparatus of the present invention use the indicators, for example a sub code in a DDS formatted tape, along with an indexing signal to align the scanner to the tracks recorded on the tape. In accordance with certain embodiments of the present invention, the alignment requires adjusting the speed of the tape to properly align the recorded tracks with the rotating scanner of the tape deck. This is accomplished by completing a calibration procedure during which an optimal delay time associated with the tape is determined using data collected from a plurality of scans of the tape while the tape is intentionally transported at a speed that is either too fast or too slow for proper alignment With the collected data, optimal timing information is calculated and the proper speed of the tape is determined. Once the proper speed has been set, then the tape and scanner will be significantly aligned. The calibration procedure can be conducted one or more times depending upon the situation, and can be conducted while the tape runs in a forward or a reverse direction.

Figure 1:
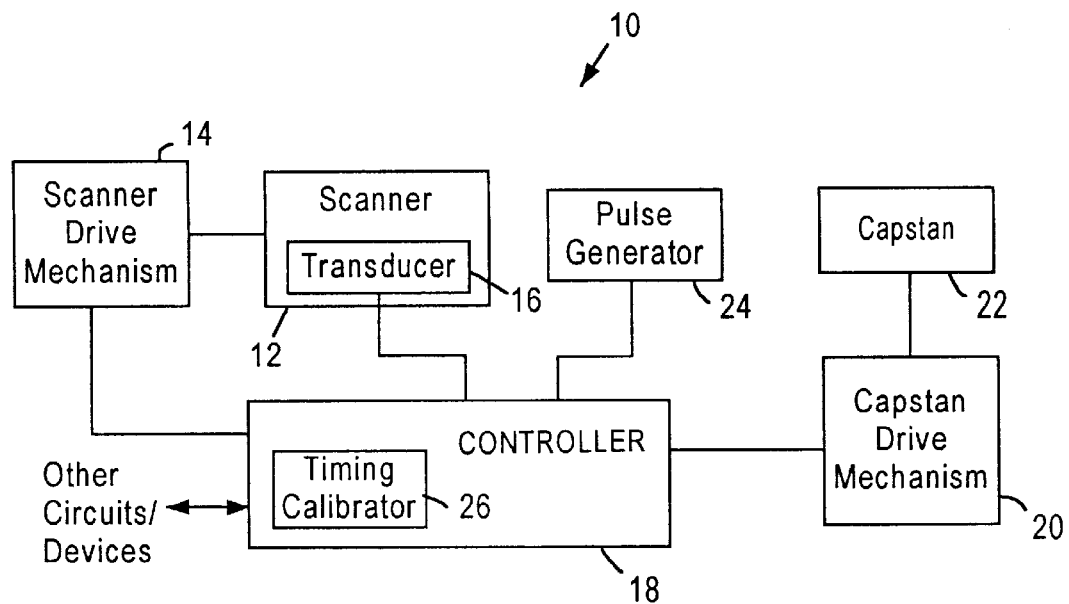
FIG. 1 is a block diagram depicting a tape drive servoing system for use in a tape drive, in accordance with an embodiment of the present invention.

With this overview in mind, FIG. 1 is a block diagram illustrating an exemplary tape drive servoing system 10 for use in a tape drive, in accordance with an embodiment of the present invention. Servoing system 10 includes a scanner 12, a scanner drive mechanism 14, a transducer 16, a controller 18, a capstan drive mechanism 20, a capstan 22, and a pulse generator 24.

Scanner drive mechanism 14 is coupled to control the rotational movement of scanner 12. Scanner 12 includes at least one transducer 16 for use in either reading data from a tape and/or writing data to the tape. For example, scanner drive mechanism 14, in an exemplary embodiment, includes a motor that is responsive to signals received from controller 18 in rotating a portion(s) of scanner 12. In this example, scanner 12 includes a scanner drum, on which a plurality of transducers 16 are provided. Transducers 16 are typically either read or write heads. By way of example, a conventional DDS scanner includes two read and two write heads. During a write operation, for example, a write head is provided with a data signal containing information, in the form of digital data received from controller 18, that is to be recorded on a tape. Conversely, during a read operation, a read head scans the tape and in response provides a scanned data signal containing information in the form of digital data to controller 18.

Although not depicted, those skilled in the art will recognize that controller 18 is typically coupled to additional circuits/devices, such as a computer processor and associated memory, that generate a data signal to be written to the tape during a write operation and/or processes the scanned data signal as part of a read operation.

Capstan drive mechanism 20 is coupled to control the rotation of capstan 22 in response to a control signal received from controller 18. Capstan 22 moves the tape a given direction(s) and at a particular speed, as directed by capstan drive mechanism 20. Thus, for example, in an exemplary embodiment of the present invention, capstan drive mechanism 20 includes an electrical motor (not shown) that drives a capstan roller 21 (see FIG. 2). Capstan roller 21 is placed in contact with the tape such that the rotational movement of capstan roller 21 causes the tape 36 to move proportionally in a longitudinal direction and at a particular speed. In this example, the capstan motor within capstan drive mechanism 20 is responsive to the control signal from controller 18. Controller 18 operates to oversee control of the servoing system 10 as it controls scanner 12 and capstan 22 and as such is responsible for coordinating the movement of the tape and the reading/writing of data from/to the tape.

In accordance with an embodiment of the present invention, controller 18 includes a timing calibrator 26 for use in calibrating or otherwise establishing proper alignment of the tape to scanner 12 during a read operation. Timing calibrator 26 includes logic that is responsive to the scanned signal from transducer 16 and an indexing signal or pulse generator (PG) signal from pulse generator 24. For example, when a tape is inserted into the tape drive and a read operation is selected, controller 18 enters into a calibrate timing process to align the scanner 12 to the tracks recorded on the tape 36. The calibrate timing process of timing calibrator 26 causes controller 18 to adjust the rotational speed of capstan 22 thereby adjusting the speed at which the tape 36 is transported over scanner 12.

As discussed in greater detail below, during a calibration timing process, controller 18 examines the scanned signal from at least one transducer 16 and the PG signal from pulse generator 24 to adjust capstan drive mechanism 20 and capstan 22 for proper tracking of the tape.

Figure 2:
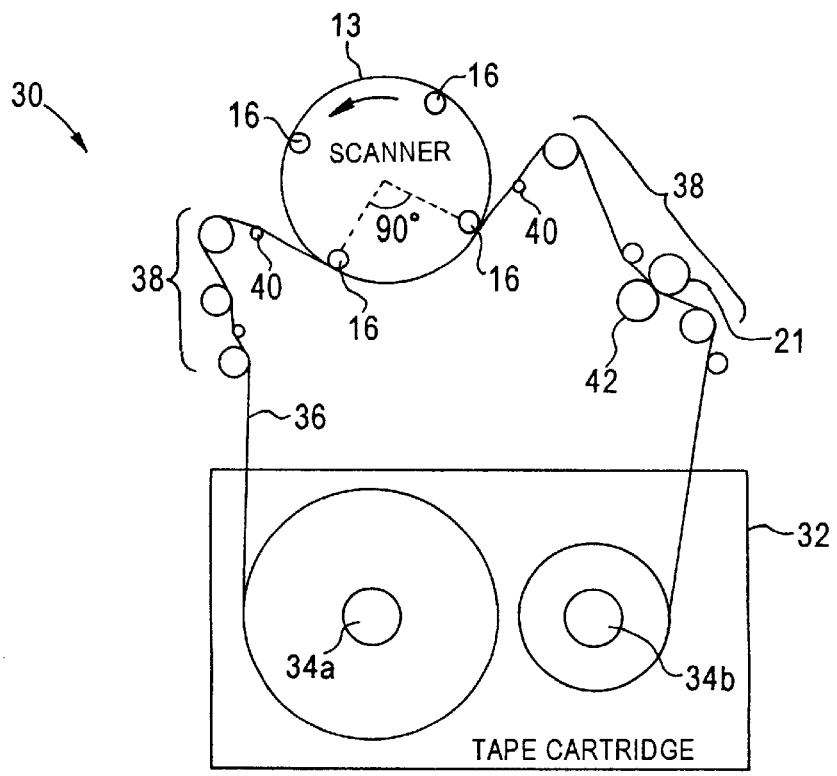
FIG. 2 depicts a tape transport mechanism for use with the tape drive servoing system of FIG. 1, in accordance with an embodiment of the present invention.

FIG. 2 depicts an exemplary tape transport mechanism 30 for use with the tape drive servoing system 10 in FIG. 1. Tape transport mechanism 30 provides a mechanism through which a tape 36 is brought into contact with the drum 13 of scanner 12. As depicted, tape 36 is provided within a tape cartridge 32, and is connected between two tape reels 34a and 34b, therein. Tape 36, upon insertion into the tape drive (or as part of a read operation) is fed through a plurality of tensioning guides 38, inclination posts 40, capstan roller 21, and a pinch roller 42. For example, in a DDS tape drive, tape 36 is brought into contact with drum 13 and wrapped for substantially 90 degrees about drum 13 via tensioning guides 38 and inclination posts 40. Tensioning guides 38 are configured to provide the proper tension to tape 36 as it is wrapped about the portion of drum 13. Inclination posts 40 are configured to control the inclination of tape 36 as it contacts drum 13.

During a read or write operation, capstan roller 21 and pinch roller 42 through which tape 36 feeds, are usually operated such that tape 36 is pulled across drum 13 from the reel 34a to reel 34b. It is recognized, however, that tape 36 can be moved in the opposite direction, namely in a reverse direction, and/or that the arrangement of various guides, rollers and capstan can be rearranged from that depicted in the example in FIG. 2.

Drum 13 includes a plurality of transducers 16 having a known geometry between them. For example, in a DDS formatted disk drive and tape, drum 13 includes four transducers 16 (i.e., two read and two write heads) which are substantially 90 degrees apart from one another as measured from the center of drum 13. The four transducers 16 form two pairs of transducers, wherein the first pair are write heads (located 180 degrees from one another), and the second pair are read heads (located 180 degrees from one another).

Referring back to FIG. 1, pulse generator 24 is an indexing mechanism by which the position of drum 13 (in FIG. 2) is monitored/determined. For example, pulse generator 24 in certain embodiments, includes circuitry that is triggered to provide a pulse for each of the transducers 16 on drum 13 based on a known angle/geometric relationship to the pulse generator indexing mechanism and the transducer 16. Thus, for example, pulse generator 24 may generate a pulse signal fifteen rotational degrees (15°) before a particular transducer 16 is expected to be over, or contact, tape 36. The use of the signal from pulse generator 24 in controller 18 and/or timing calibrator 26 will be discussed in greater detail below.

Figure 3:
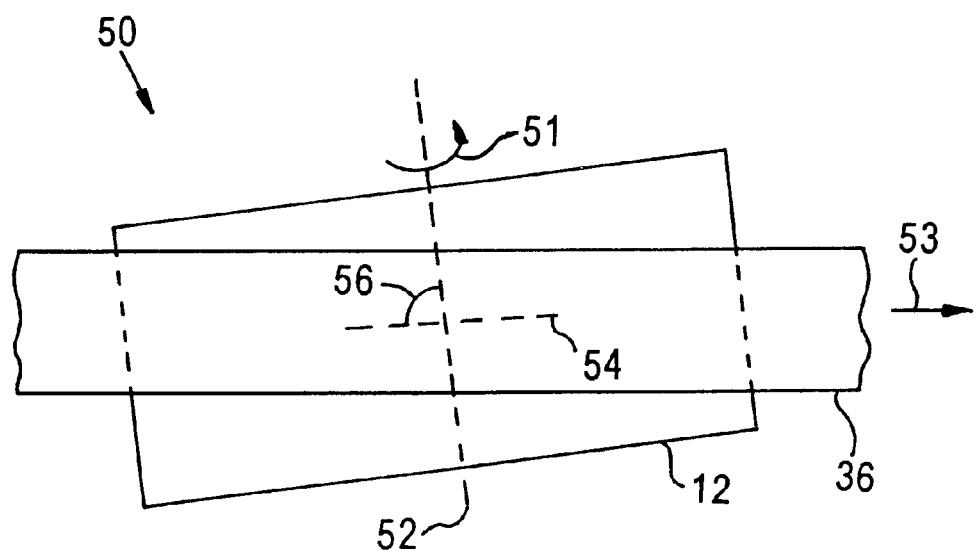
FIG. 3 depicts an interface between a tape and a scanner drum as in FIG. 2, in accordance with an embodiment of the present invention.

FIG. 3 depicts a tape interface 50 as viewed through the tape 36 towards drum 13. From the rotation angle on drum 13, about scanner axis 52, the helical track of drum 13 across the surface of tape 36 can be seen. Thus, when drum 13 is rotated, as depicted by arrow 51, the transducer(s) 16 on drum 13 move or scan diagonally across the surface of tape 36, which is itself moving along a longitudinal axis 54 in the direction depicted by arrow 53. As a result, diagonal tracks are laid down upon tape 36 during a write operation. Similarly, in a later read operation the tracks are scanned by a read head traveling in the same direction as the write head.

Figure 4:
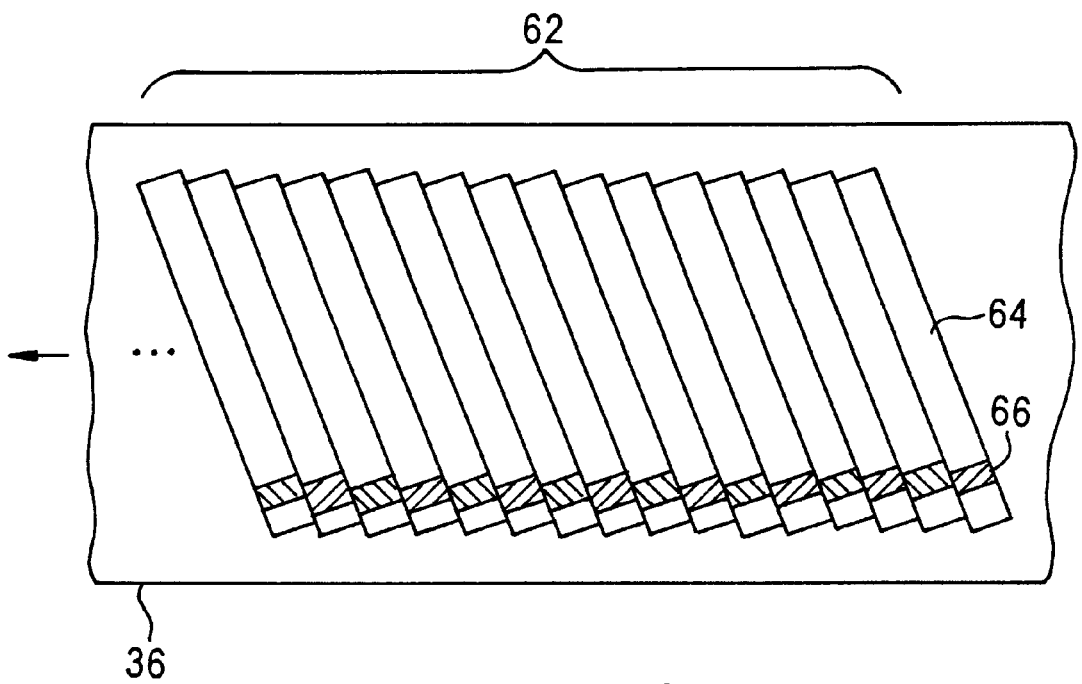
FIG. 4 depicts a tape having a plurality of data tracks recorded thereon and formatted in accordance with an embodiment of the present invention.
Figure 5:
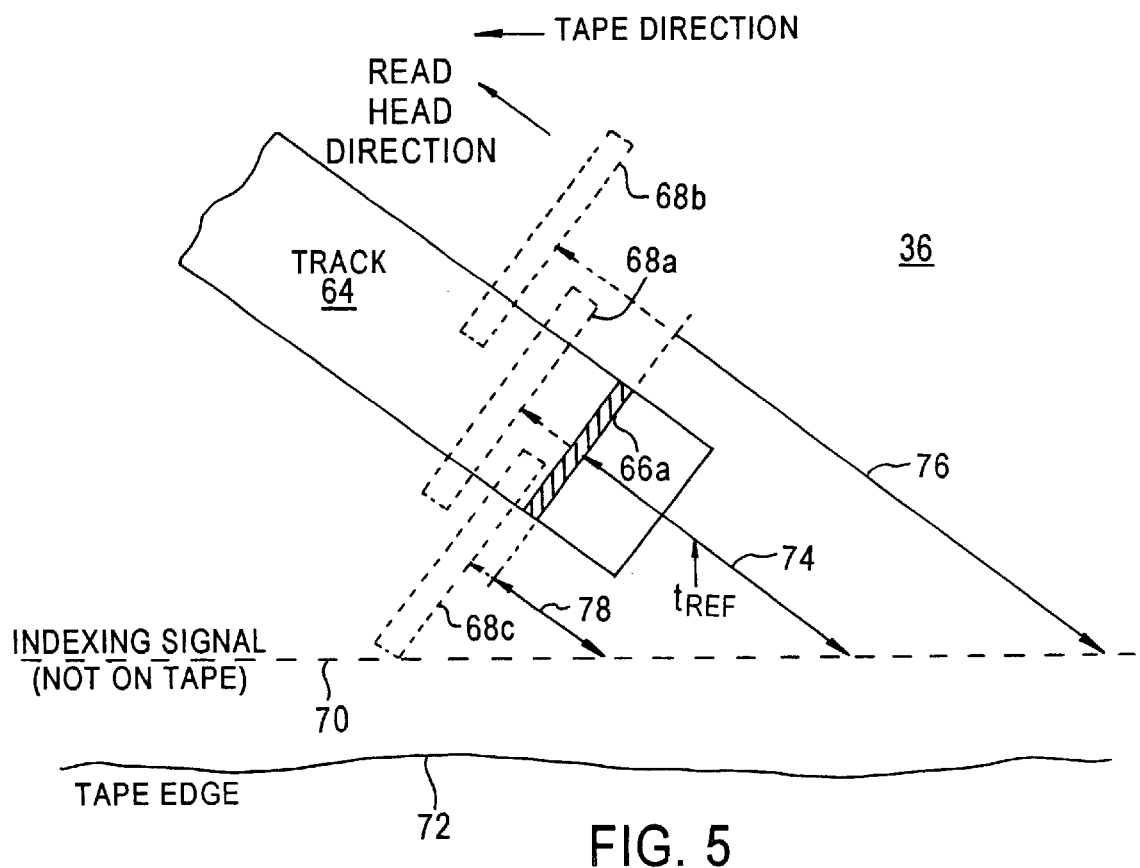
FIG. 5 depicts a portion of a track as recorded on the tape in FIG. 4 and formatted in accordance with an embodiment of the present invention.

FIGS. 4 and 5 depict various features of the data tracks recorded on a formatted tape in accordance with an exemplary embodiment of the present invention. FIG. 4 depicts a tape 36 having a plurality of tracks 62 recorded diagonally across the recording surface of tape 36. Note that tape 36 is illustrated as viewed from drum 13, in contrast to FIG. 3, and therefore the tape is moving in an opposite direction in this figure when compared to FIG. 3. Tape 36 is not drawn to scale and the actual length of the diagonal tracks 62 are substantially longer due to the typically small angle 56 (see FIG. 3) between the longitudinal axis 54 of tape 36 and scanner axis 52. For example, angle 56 in a conventional DDS formatted tape is approximately 6 degrees.

Tape 36 includes within each of the plurality of tracks 62 a sub code area 66, wherein sub code or a similar type of data is recorded Note, that it is recognized that there may be a plurality of sub code areas, such as, for example, in a DDS2 formatted tape, or that there may be formats that only record sub code data in particular tracks. Moreover, while shown in FIGS. 4 and 5 as being located nearer to one end of each track 62, it is recognized that the sub code area 66 can be located anywhere within a track 62.

A portion of data track 64 is depicted in FIG. 5. As shown, data track 64 is recorded onto tape 36 and includes a sub code area 66. Data track 64 is positioned in a diagonal direction leading away from a lower tape edge 72. Tape edge 72 is depicted, for illustrative purposes, as having a less than perfectly straight edge, and track 64 is offset from tape edge 72 by a finite distance.

FIG. 5 depicts exemplary potential positions 68a–c that may be followed by a read head 16 during a subsequent read operation in which data track 64 is to be scanned. A properly aligned read head 16 is depicted in position 68a. In position 68a, read head 16 scans substantially all of track 64. Conversely, a misaligned read head 16 is depicted by positions 68b and 68c. Notice that in positions 68b and 68c only a portion of track 64 is being scanned.

Although not actually a part of the information recorded on tape 36, there is further illustrated in FIG. 5 a point 70 (as depicted by a dashed line) wherein during a scanning cycle (e.g., as depicted by the positions 68a–c and associated diagonal scanning directions) a timing signal is generated based on the rotational position of the scanner 12. Based on the occurrence of the timing signal at point 70, it is possible to measure a delay time from, point 70 until sub code area 66 is scanned. Such a delay time is shown for each of the positions 68a–c for the read head 16 and the detection of sub code area 66 within track 64.

In the case of substantially aligned read head 16 at position 68a, there is depicted an optimal delay time 74 as measured from an occurrence of an indexing signal at point 70 to detection of the sub code area 66 as read head 16 scans the sub code data recorded within the sub code area 66. This optimal delay time will be referred to as $t_{REF}$.

In the case of a misaligned read head 16 at position 68b, there is depicted a longer delay time 76 as measured from an occurrence of an indexing signal at point 70 to detection of the sub code area 66 as read head 16 scans a portion of the sub code data recorded within the sub code area 66.

Similarly, in the case of a misaligned read head 16 at position 68c, there is depicted a shorter delay time 78 as measured from an occurrence of an indexing signal at point 70 to detection of the sub code area 66 as read head 16 scans a portion of the sub code data recorded within the sub code area 66.

Figure 6:
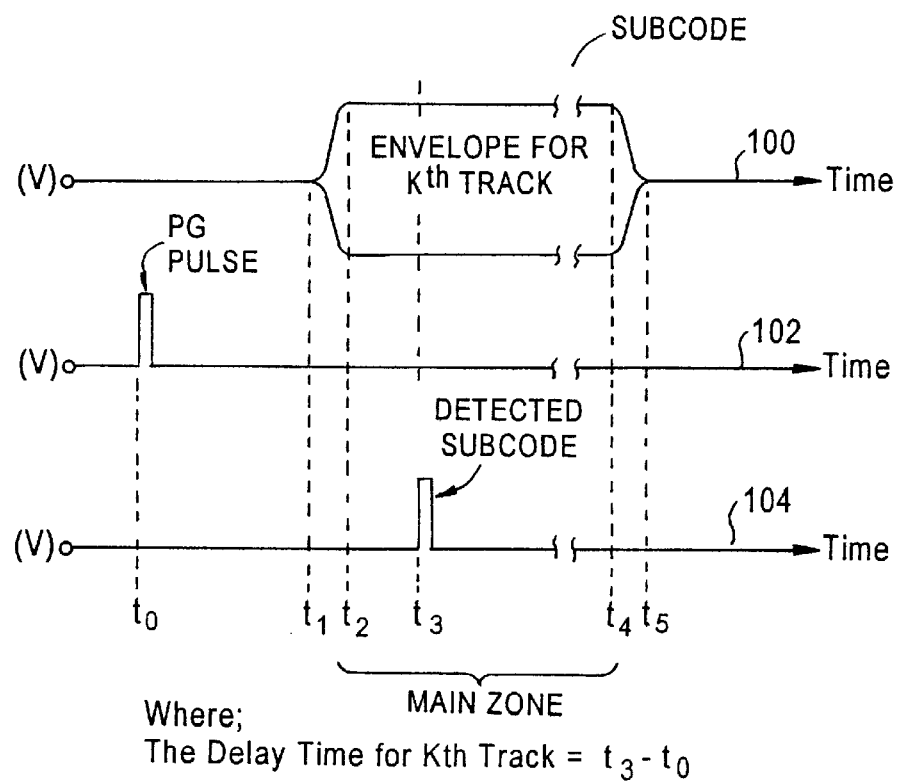
FIGS. 6 is a timeline graph depicting an envelope of a scanned signal from a data track as in FIGS. 4 and 5, an indexing signal and a detected sub code signal, in accordance with an embodiment of the present invention.

FIG. 6 is a timeline graph depicting the timing references used by controller 18 during a calibration timing process in accordance with an embodiment of the present invention. Note that the signals in FIG. 6 are illustrative only, and are therefore not drawn to scale. Furthermore, the signals depicted in FIG. 6 are for a single scan of the tape 36 based on a significantly aligned read head 16 scanning a signal track 64, at position 68a as, for example, in FIG. 5. The uppermost signal is a detected envelope 100 associated with the plurality of fluctuations of the signal from readhead 16 as it scans and detects the data recorded within track 64. Envelope 100 begins at approximately time $t_1$ and ends at approximately time $t_5$. Envelope 100, for example, is detectable via a conventional envelope detection circuit configured to receive a scanned signal from read head 16.

The center signal in FIG. 6 is an indexing pulse signal 102 as provided to controller 18 by pulse generator 24. As shown, there is a pulse occurring at time $t_0$. The pulse (i.e., PG pulse) is generated by pulse generator 24 when drum 13 passes by an index at approximately time $t_0$. For example, an optical, mechanical, magnetic switching/indicating device can be provided within pulse generator 24 to detect the position of drum 13 about scanner axis 52.

The bottom signal in FIG. 6 is a detected sub code signal 104 generated within controller 18 based on the scanned signal from read head 16. As depicted, a pulse is provided when the sub code data is read for a given scan. By way of example, a detection circuit (not shown) within controller 18 can be used to isolate and/or identify a particular sub code frequency signal in the scanned signal, from which a transition, such as, for example, a pulse can be generated. In this example, the sub code data was read/detected at approximately time $t_3$.

Although signals 102 and 104 are depicted as having pulses indicative of the ting of certain referencing events, it is recognized that other types of transitioning signals can be used, such as , for example, a logical transition can occur to indicate the referenced time.

For a properly aligned scanner and tape, the delay time between the pulses in signals 102 and 104 is the $t_{REF}$. Since FIG. 6 depicts the signals for a properly aligned scanner and tape, $t_{REF} = t_3 - t_0$ in this figure. Furthermore, when the scanner and tape are properly aligned, each delay time associated with a plurality of scans (i.e., tracks), will be approximately equal to one another (provided that the sub codes are recorded in the tracks at or about the same location within each of the tracks). Thus, there is an optimal $t_{REF}$ for a set of tracks written by a scanner.

To calibrate (e.g., substantially align) the scanner to the tracks, it is therefore necessary to measure or otherwise determine the optimal $t_{REF}$ and to alter the tape drive during a read operation such that each delay time is approximately equal to the optimal $t_{REF}$.

Once the $t_{REF}$ is determined, the speed at which the tape is transported is adjusted to cause each measured $t_{REF}$ to approximately equal the optimal $t_{REF}$. Thus, if the measured delay times are greater than the optimal $t_{REF}$ then the tape is running at a speed that is too slow (e.g., as in the case of read head 16 scanning to position 68b in FIG. 5). Conversely, if the measured delay times are less than the optimal $t_{REF}$ then the tape is running at a speed that is too fast (e.g., as in the case of read head 16 scanning to position 68c in FIG. 5).

To determine the optimal $t_{REF}$ for a tape, in accordance with one embodiment of the present invention, timing calibrator 26 causes controller 18 to enter into a calibrate timing process wherein controller 18 provides a control signal (e.g., a position error signal (PES)) to capstan drive mechanism 20 which causes the tape to be transported at a first speed. The first speed is either greater than or less than an expected or nominal speed for the tape format. For example, in one embodiment the first speed is approximately 10 percent greater than the nominal speed. As such the tracking is intentionally misaligned.

When the scanner 12 is misaligned read head 16 will not be centered over track 64 and will eventually cross over from track 64 to one or more other tracks during a scan. Moreover, for a set of K number of scans, the resulting envelopes of the scanned signals will reflect this misalignment as the envelopes, when compared to one another rise and fall in crossing over adjacent tracks, and/or as a track is only slightly covered by the read head 16 resulting in a lower average amplitude of the envelope.

As discussed below, by comparing the results from a plurality of scans in the set of K scans when the scanner 12 is intentionally misaligned, it is possible to determine when read head 16 is properly aligned, or as aligned as possible, with the track 62, and to thereby further determine a corresponding $t_{REF}$.

Figure 7:
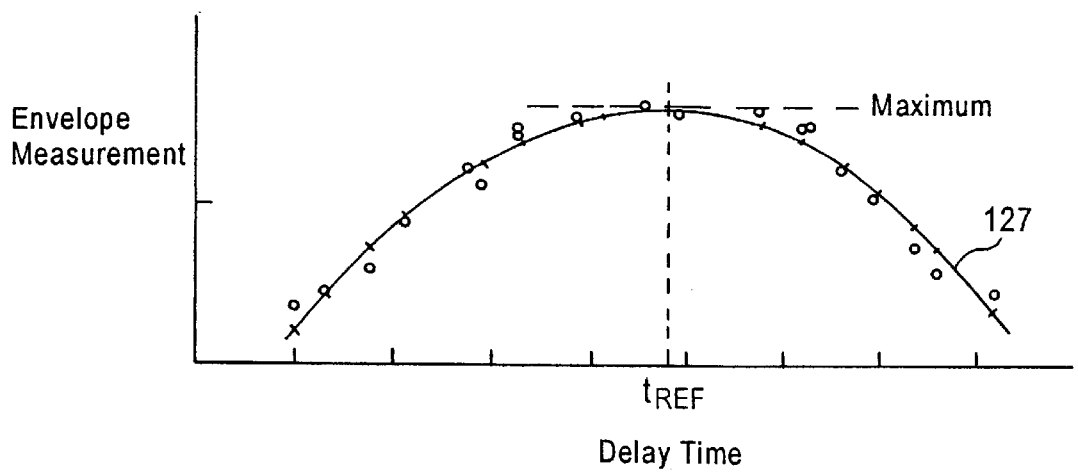
FIG. 7 is a graph depicting envelope measurements for a plurality of scans versus corresponding measured delay times, in accordance with an embodiment of the present invention.

Before discussing an exemplary method for determining $t_{REF}$, the relationship between the three signals in FIG. 6 will first be described. FIG. 7 depicts a graph of envelope measurements versus measured delay times for a set of scans (e.g., K=20) of a tape 36 running at approximately 1.1 times nominal speed (i.e., about 10% faster than normally expected). Running the tape at this increased speed (or, similarly at a decreased speed), causes each scan to be off-track, wherein some scans will be more on-track than others but still not properly aligned. The difference between scans is used to determine the proper speed required to optimize the alignment, in accordance with an embodiment of the present invention.

Each of the square marks, in FIG. 6, represents a normalized sum of a plurality of sampled amplitudes for an envelope (i.e., an envelope measurement). It is preferred that the sample amplitudes be collected during a main zone period (e.g., see FIG. 6 between times $t_2$ and $t_4$). For example, in one embodiment, eight samples are taken at approximately equal intervals during the main zone period. These samples are then summed together and the result is normalized to produce an envelope measurement.

In FIG. 7, the envelope measurements for each Kth scan are plotted along the y-axis of the graph and at positions along the x-axis of the graph corresponding to the measured delay times for the each of the scans. As shown, there is a characteristic parabolic shape to the data plotted in FIG. 7. This parabolic shape is used to determine the optimal $t_{REF}$.

In accordance with an exemplary embodiment of the present invention, the set of data that leads to this parabolic shape is curve fitted with an approximating function, for example a second order polynomial function is determined by applying a least squares technique to the data set. In FIG. 7 the "Xs" represent such a curve fitting as illustrated via connecting curve 127.

After an approximating function has been determined, the maximum local value (i.e., the Y-axis maximum) for the function and the corresponding $t_{REF}$ (i.e., along the X-axis) for this maximum value is calculated. This corresponding $t_{REF}$ is, therefore, the optimal $t_{REF}$ (as estimated). This optimal $t_{REF}$ can then be used within controller 18 to adjust the speed of the tape in subsequent scans to the point where the measured delay time for the subsequent scans are approximately equal to the optimal $t_{REF}$.

Figure 8:
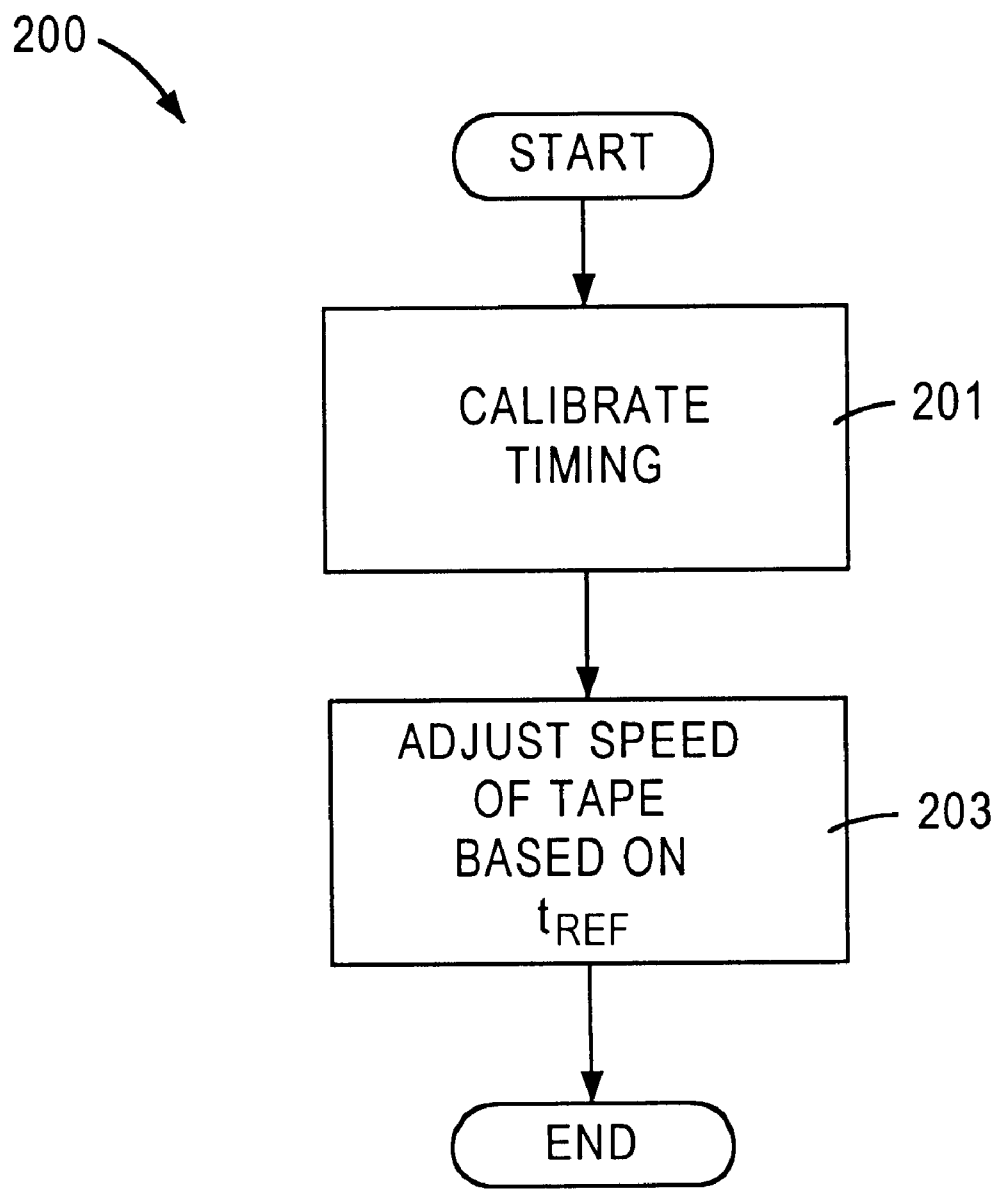
FIG. 8 is a flow chart depicting a method for timing track adjustment including a calibrate timing step, in accordance with an embodiment of the present invention.

FIG. 8 illustrates a method for timing track adjustment 200, in accordance with an embodiment of the present invention. Method 200 begins with a calibrate timing process 201 during which an optimal $t_{REF}$ is determined. Once the optimal $t_{REF}$ is determined in calibrate timing process 201 then, the speed of the tape is adjusted in step 203 based on the optimal $t_{REF}$ as determined in process 201.

Figure 9:
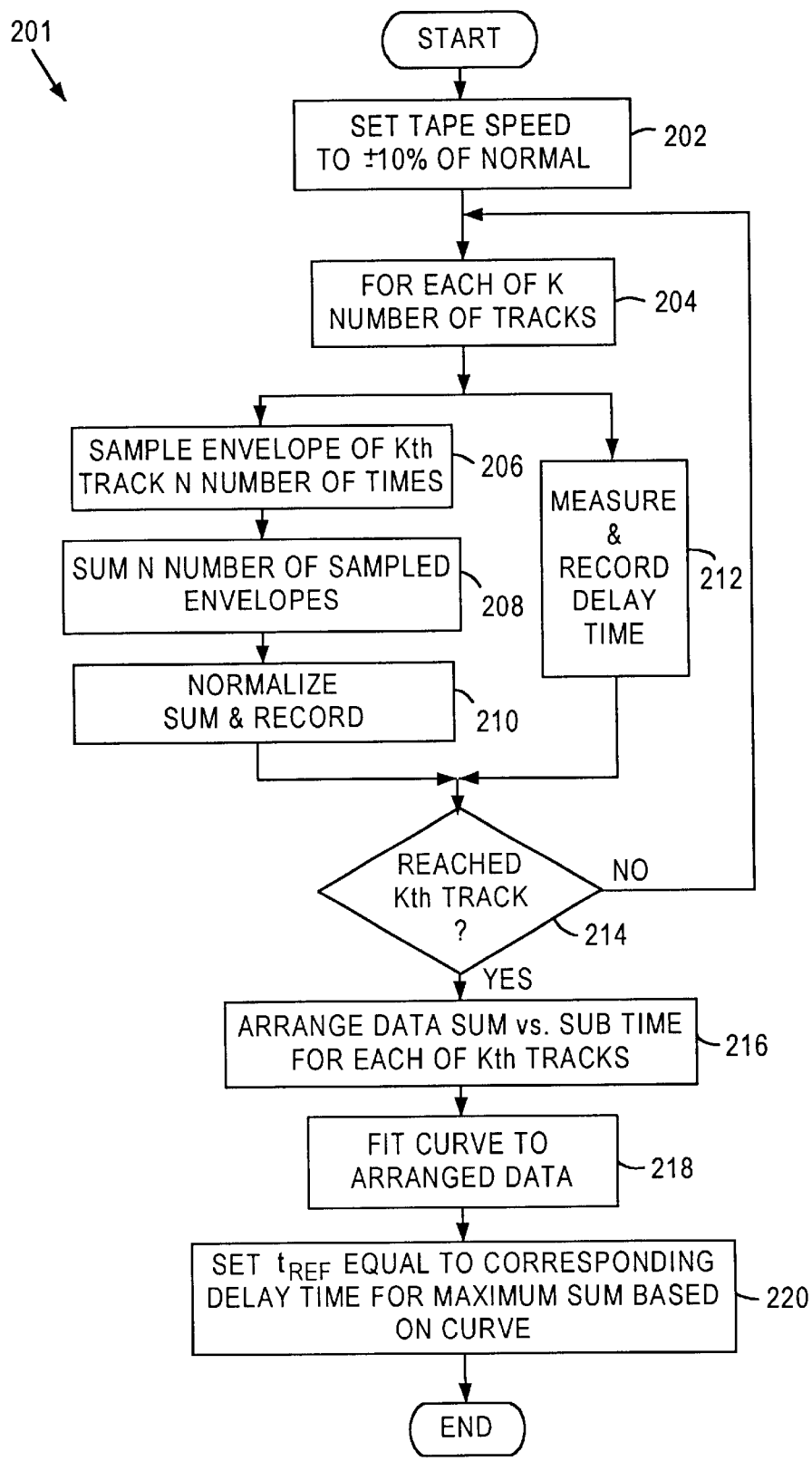
FIG. 9 is a flow chart depicting a calibrate timing process, as in FIG. 8, in accordance with an embodiment of the present invention.

FIG. 9 further illustrates calibrate timing process 201 in accordance with an embodiment of the present invention. Process 201 includes step 202 wherein the tape speed is set to a first speed that is either greater or less than an expected or nominal speed of the tape. For example, the tape speed is adjusted in an exemplary embodiment by plus or minus 10 percent of the nominal speed.

While the tape is running at the first speed, in step 204 a sample portion of the tape is scanned K number of times using one or more read heads. In step 206 the envelope for each of the scanned tracks (albeit potentially misaligned) is sampled N number of times, preferably at substantially even intervals within a main zone of the envelope. Next, in step 208, the N number of sampled envelope voltages are summed together. In step 210, the result of step 208 is then normalized with respect to zero volts and the resulting envelope measurement is recorded. Additionally, for each of the K number of scans in step 212, the corresponding delay time is measured and recorded based on the indexing signal and the detected sub code.

Next, in step 214, it is determined if the end of the scanned set has been reached, i.e., has the Kth scan occurred. If the answer is no, then process 201 returns to step 204 and the next Kth number scan is completed. If the answer to decision 214 is yes, then the sample set has been completed and process 201 continues with step 216.

In step 216, the data (i.e., the envelope measurement and corresponding delay time for each of the K number of scans, or a subset thereof) is arranged for processing via a curve fitting procedure. For example, the data can be further processed and/or stored in a particular data structure within a memory (not shown). Step 218 provides a curve fitting procedure whereby the arranged data in 216 is fit to a second order polynomial curve or other like approximating function using a known curve fitting technique, such as, for example, a least squares approximating technique.

Once the curve fitting has been completed in step 218, then in step 220 the calibrate timing process 201 is concluded by using the approximating function to calculate an optimal $t_{REF}$. In step 220 the optimal $t_{REF}$ is determined by finding a local maximum for the approximating function and determining a corresponding delay time for the maximum value. The corresponding delay time is then considered to be the optimal $t_{REF}$.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. An apparatus comprising:

means for calibrating a speed of a tape in a tape drive based on a scanned track envelope signal and timing of scanning of a code within a track relative to timing of an index signal; and a scanner configured within the tape drive to produce the scanned track envelope signal, the index signal and a signal indicating scanning of the code, by reading the tape.

2. An apparatus comprising:

a tape drive for scanning a tape to read information therefrom and produce a scanning signal; and means, coupled to the tape drive, for calibrating a speed of the tape in the tape drive based on the envelope of the scanning signal and timing of detection of a code within a track relative to a predetermined index of the tape drive.

3. An apparatus comprising:

a tape drive for scanning a tape and producing a scanning signal and an index signal; and means, coupled to the tape drive, for calibrating a speed of the tape in the tape drive based on the envelope of said scanning signal and timing of detection of a predetermined code within a track on the tape relative to the index signal.

* * * * *